United States Patent [19]
McNevin

[11] Patent Number: 6,028,915
[45] Date of Patent: Feb. 22, 2000

[54] METHOD AND APPARATUS FOR MAKING AN EMERGENCY CALL WHILE ON-LINE ON A COMPUTER

[76] Inventor: Christopher Jordan McNevin, 728 24th St., Santa Monica, Calif. 90402-3138

[21] Appl. No.: 09/245,001

[22] Filed: Feb. 4, 1999

[51] Int. Cl.[7] .................................................. H04M 11/04
[52] U.S. Cl. ................................................. 379/49; 379/40
[58] Field of Search ........................... 379/37–51, 90.01, 379/110.01, 93.01–93.08, 93.26–93.28, 93.37, 354–357

[56] References Cited

U.S. PATENT DOCUMENTS

| | | |
|---|---|---|
| 4,706,067 | 11/1987 | Hauck . |
| 4,839,892 | 6/1989 | Sasaki . |
| 4,908,845 | 3/1990 | Little . |
| 5,392,329 | 2/1995 | Adams et al. . |
| 5,793,840 | 8/1998 | Zhuang et al. ............................. 379/51 |
| 5,828,292 | 10/1998 | Kokhan . |

*Primary Examiner*—Wing F. Chan
*Attorney, Agent, or Firm*—Pillsbury Madison & Sutro LLP

[57] ABSTRACT

A method and system for making an emergency call while on-line on a computer includes an input device attached to the computer adapted to receive a command from a computer user for making an emergency call. When user initiates a command to make an emergency call from the input device, a software program executing on the computer overrides all computer functions and transmits the emergency call to an emergency call receiver through the network or by a telephone line. The software program takes priority over all other computer applications on the computer. The invention transmits the emergency call using a computer generated signal, or by computer generated voice, or by way of a facsimile transmission. The emergency call may also include additional pre-stored information held in a memory program, such as address, telephone, e-mail, and medical information, which may be automatically sent along with the emergency call to the emergency call receiver.

38 Claims, 3 Drawing Sheets

FLOW CHART OF MAKING EMERGENCY CALL WHILE ON-LINE

FLOW CHART OF MAKING EMERGENCY CALL WHILE ON-LINE

FLOW CHART OF MAKING EMERGENCY CALL FROM A COMPUTER

6,028,915

METHOD AND APPARATUS FOR MAKING AN EMERGENCY CALL WHILE ON-LINE ON A COMPUTER

BACKGROUND OF THE INVENTION

Computers have become extremely popular in many households today, especially for connecting onto the Internet. The most popular way to connect a computer onto the Internet is through a computer modem over a telephone line. However, most households still have only one telephone line and must share this telephone line with traditional voice calls and calls to connect onto the Internet or for sending and receiving facsimiles through the computer or via a dedicated facsimile machine.

When a house has only one telephone line, and someone is either on-line on the Internet or is sending or receiving a facsimile, the telephone line is inoperative for telephone calls. No calls may be made over the telephone line until the existing connection is terminated and another connection is established. However, disconnecting the existing facsimile or computer connection in order to make a 911-emergency call can consume valuable time, especially if the computer user is experiencing an immediate medical or other emergency, or has a special medical condition requiring immediate response by emergency services personnel. Additionally, if the telephone is not physically located in the same room as the computer terminal, a person who is experiencing an emergency may not have sufficient time or ability to move from the computer terminal to the telephone area.

Furthermore, the person giving assistance to the computer user may not know how to exit the Internet or fax function to disconnect the computer so that an emergency call may be made. The ability to easily make an emergency call from the computer, without having to leave the computer area, would be advantageous to computer users, particularly those with special medical conditions. The ability to easily make an emergency call from the computer itself while working on the computer could save lives by enabling emergency calls to go out immediately, thereby reducing the time of response by emergency services personnel. This longstanding problem needs to be addressed.

No teachings or disclosures of the prior art have suggested this type of a solution, although a brief resume of the other U.S. patents related to this problem shows that it is prominent, and requires immediate attention.

For example, U.S. Pat. No. 5,392,329, Automatic Call Distribution System with Emergency Recording System and Method, to Adams et al., issued Feb. 21, 1995, showed an automatic call distribution system for emergency recording. The Adams et al. system, however, would not interface with the Internet as does the present invention.

Likewise, U.S. Pat. No. 4,908,845, Audio/Telephone Communication System for Verbally Handicapped, to Little, issued Mar. 13, 1990, showed the need for an emergency system—but similarly does not contemplate Internet/facsimile interplay or the problem of a limited supply of available telephone lines.

While U.S. Pat. No. 4,839,892, Concentrator System Capable of Completing Emergency Calls Under Congested Traffic, to Sasaki, issued Jun. 13, 1989, was directed towards congested communication systems, it was radio-based, unlike the teachings of the present invention.

U.S. Pat. No. 4,706,067, Switch Actuated Communication Device, to Hauck, issued Nov. 10, 1987, showed the need for signal generation and integration, but the involved circuitry differs from the instant teachings.

U.S. Pat. No. 5,828,292, Button Emergency Signal via Incorporated Transmitter, to Kokhan, issued Oct. 27, 1998, discloses a 3-button emergency signal device using a transmitter to transmit a unique transmission signal for receipt by a specific emergency facility upon the depression of a designated button. However, the device disclosed in the Kokhan reference requires each of the emergency facilities to have a receiver to receive the transmission signals and does not utilize existing telecommunication media, such as the Internet or conventional telephone lines to transmit the emergency call. The device disclosed in the Kokhan reference is also not capable of transmitting other information associated with the emergency other than the call for the emergency assistance itself.

Clearly, there is a longstanding need for a novel, enhanced emergency call prioritizing and facilitating system not ameliorated by the teachings of the prior art.

SUMMARY

An object of an embodiment of the present invention is to allow a computer user to make an emergency call while on-line on a computer.

Another object of an embodiment of the present invention is to allow a computer user to make an emergency call while using a computer not connected to a network.

Another object of an embodiment of the present invention is to provide a simple and easy way to a computer user to request emergency services.

Another object of an embodiment of the present invention is to allow a computer user to request emergency services with one touch of a button.

Another object of an embodiment of the present invention is to allow a computer user to request emergency services by typing a command into the computer.

Another object of an embodiment of the present invention is to allow a computer user to request emergency services by a voice command directed to the computer.

Furthermore, an object of an embodiment of the present invention is to allow a computer user to send pre-stored important information all at once, such as address, telephone, e-mail, and medical information, upon making an emergency call, even if the computer user is unconscious or otherwise unable to speak.

Briefly, an embodiment of the present invention is directed to an emergency call system for making an emergency call while on-line on a computer. The emergency call system includes an input device to the computer adapted to receive a command from a computer user for making an emergency call. Once the computer user issues the command to make an emergency call, a software program executing on the computer overrides all computer functions, including, but not limited to Internet and facsimile work in progress, and transmits the emergency call over a network to an emergency call receiver.

The emergency call may be transmitted over a computer network, or by other existing telecommunication media, such as by telephone or facsimile. Once the computer user issues the command to make an emergency call, important pre-recorded information, such as address, telephone, e-mail, and medical information may be automatically sent along with the emergency call to the emergency call receiver.

The computer user, experiencing an emergency while on-line on the computer, may issue the command to make an emergency call in a number of ways, such as, by pushing a single emergency button on the keyboard, either one dedicated to this use or a multi-function key, by typing in a command on the computer, or speaking by voice into a voice recognition device attached to the computer. Because the emergency call takes priority over all functions performed on the computer, the software program executing on the computer is able to transmit the emergency call from the computer to an emergency call receiver.

Similarly, in another embodiment of the present invention, even if the computer user is not on-line on the computer, but nevertheless still working on the computer, the computer user may still make an emergency call in the same fashion as described above. The software program executing on the computer also overrides all computer functions in order to transmit the emergency call. However, the computer will transmit the emergency call directly to an emergency call receiver without utilizing a network connection, or by establishing a network connection and proceeding as described above.

An emergency call system for making an emergency call while on-line on a computer, the system comprising: an input device attached to the computer for receiving a command to make the emergency call; and a software program executing on the computer capable of recognizing the command to make the emergency call and overriding all computer functions to transmit the emergency call over a network to an emergency call receiver.

An emergency call system for making an emergency call while on-line on a computer, the system comprising: an input device attached to the computer for receiving a command to make the emergency call; and a software program executing on the computer capable of recognizing the command to make the emergency call and overriding all computer functions to disconnect the computer from a network, and transmitting the emergency call by a computer communications device to an emergency call receiver.

An emergency call system for making an emergency call from a computer, the system comprising: an input device for receiving a command to make the emergency call; and a software program executing on the computer capable of recognizing when the command to make the emergency call is made and overriding all computer functions, and transmitting the emergency call by a computer communications device to an emergency call receiver.

A method of making an emergency call while on-line on a computer, the method comprising the steps of: recognizing a command to make an emergency call; and overriding all computer functions to transmit the emergency call over a network to an emergency call receiver.

A method of making an emergency call while on-line on a computer, the method comprising the steps of: recognizing a command to make an emergency call; overriding all computer functions to disconnect the computer from a network; and transmitting the emergency call by a computer communications device to an emergency call receiver.

A method of making an emergency call from a computer, the method comprising the steps of: recognizing a command to make an emergency call; overriding all computer functions; and transmitting the emergency call by a computer communications device to an emergency call receiver.

A method and system for making an emergency call while on-line on a computer includes an input device attached to the computer adapted to receive a command from a computer user for making an emergency call. When user initiates a command to make an emergency call from the input device, a software program executing on the computer overrides all computer functions and transmits the emergency call to an emergency call receiver through the network or by a telephone line. The software program takes priority over all other computer applications on the computer. The invention transmits the emergency call using a computer generated signal, or by computer generated voice, or by way of a facsimile transmission. The emergency call may also include additional pre-stored information held in a memory program, such as address, telephone, e-mail, and medical information, which may be automatically sent along with the emergency call to the emergency call receiver.

Other features and advantages of the invention will become apparent from the following detailed description, taken in conjunction with the accompanying figures, which illustrate, by way of example, various features of embodiments of the present invention.

DETAILED DESCRIPTION OF THE INVENTION

An embodiment of the present invention is directed to an emergency call system for a computer user to make an emergency call while on-line on a computer. The emergency call system includes an input device attached to the computer adapted to receive a command from the computer user to make the emergency call; and a software program executing on the computer system is capable of recognizing the command to make the emergency call and overriding all computer functions to transmit the emergency call over a network to an emergency call receiver.

The input device may be anything that can produce a signal to the computer so that the software program executing on the computer will know when a command to transmit an emergency call is made and to override all computer functions to make that call. The input device may be any one of a variety of hardware devices that may be attached to the computer, such as a keyboard, a mouse, a dedicated or multi-function button on a keyboard or mouse, or a voice recognition device.

The software program of the emergency call system is written so that it resides in the background of the computer operating system, but constantly monitors the input device attached to the computer for the command to make an emergency call. The software program is preferably stable enough to execute on the computer in a multi-tasking environment, and the software program allocates the computer resources so that it takes priority over all other computer applications. Those skilled in the art will readily perceive how this works.

Also attached to the computer is a computer communications device, such as a modem or a network card, that is adapted to allow the computer to transmit the emergency call to the emergency call receiver. The computer communications device may transmit the emergency call over a network, such as the Internet, and may be capable of transmitting an emergency call using a computer generated voice. The computer communications device may also transmit the emergency call in the form of a facsimile.

Instead of transmitting the emergency call over the network, the software program may also disconnect the computer from the network connection, and then transmit the emergency call using the computer communications device by another telecommunication medium, such as a telephone line or a wireless cellular transmission.

The emergency call system may also be useful even if the computer is not on-line, but the computer user is nevertheless using the computer. Once the computer user issues the command to make an emergency call, the software program will override all computer functions and transmit the emergency call to the emergency call receiver, without having to first disconnect from the network connection because the computer was not on-line initially. Referring now to the figures, a representative, but not limiting, set of embodiments is featured.

Figure 1:
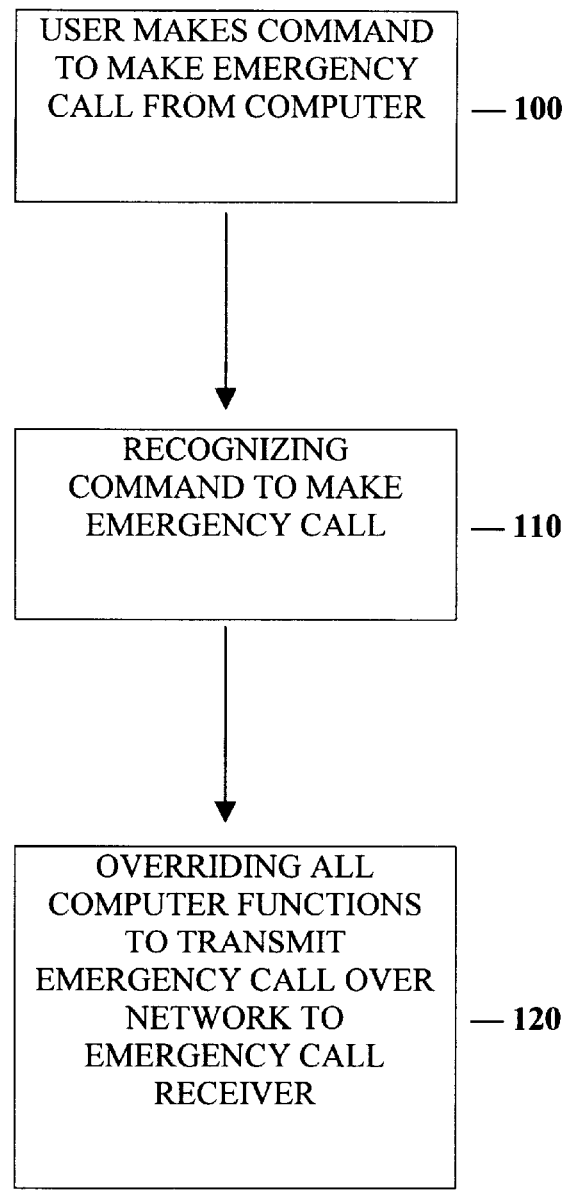
FIG. 1 is a flow chart diagram illustrating the process of making an emergency call while on-line on a computer in accordance with an embodiment of the present invention.

FIG. 1 illustrates a process of making an emergency call while on-line on a computer in accordance with an embodiment of the present invention. The computer user operating on the computer may issue a command to make an emergency call from the computer in step 100. There are several ways the computer user may issue a command to make the emergency call, including: (1) the computer user may push a dedicated emergency button or key on the computer keyboard or mouse; (2) the computer user may type in the command on the keyboard, such as "911" or "CALL 911"; and (3) the computer user may also issue a voice command to the computer, by saying the words "911" or "CALL 911". Likewise, other developed mechanisms work within the context of the instant system.

In an embodiment of the present invention, a software program recognizes the computer user's command to make an emergency call in step 110. The software program may be adapted to recognize, for example, when the emergency button is activated on the keyboard or some other input device, when the words "911" or "CALL 911" are typed on the keyboard, or when the words "911" or "CALL 911" are spoken by the computer user. A voice recognition device may be attached to the computer to recognize when the command to make an emergency call is made (i.e., when the words "911" or "CALL 911" are spoken).

Finally, the software program, upon receiving the command to make an emergency call, overrides all other computer functions and transmits the emergency call over a network to an emergency call receiver in step 120. The software program takes priority over all other computer functions, and all other computer applications are subordinate to the software program to allow it to have the computing resources to transmit the emergency call. Depending on the ability of the local emergency services in a particular jurisdiction, those emergency call receivers that are capable will receive an emergency call over the network. Because of the ability to place a conventional telephone call over the Internet, the software program may be configured to place an emergency call over the Internet to the local emergency call receiver as a conventional telephone call. Once the emergency call receiver picks up the call, the software program may provide the emergency information by using a computer generated voice, or in a facsimile format if the emergency call receiver is adapted to receive facsimile transmissions. Along with the emergency call itself, other information may be included in the emergency call, such as the computer user's address information, telephone information, e-mail information, and medical information. This information may be pre-recorded and pre-stored in a memory storage medium, such as on a hard disk drive of the computer, and managed by a memory program. The computer user may configure what information is to be included along with the emergency call upon installation of the emergency call system. The software program also may be adapted to transmit any other type of information that the computer user wishes to include. Such information, including other critical data (such as, adverse drug event information, or other software or database linkages) may be further customized and modified by those of ordinary skill in the art.

Figure 2:
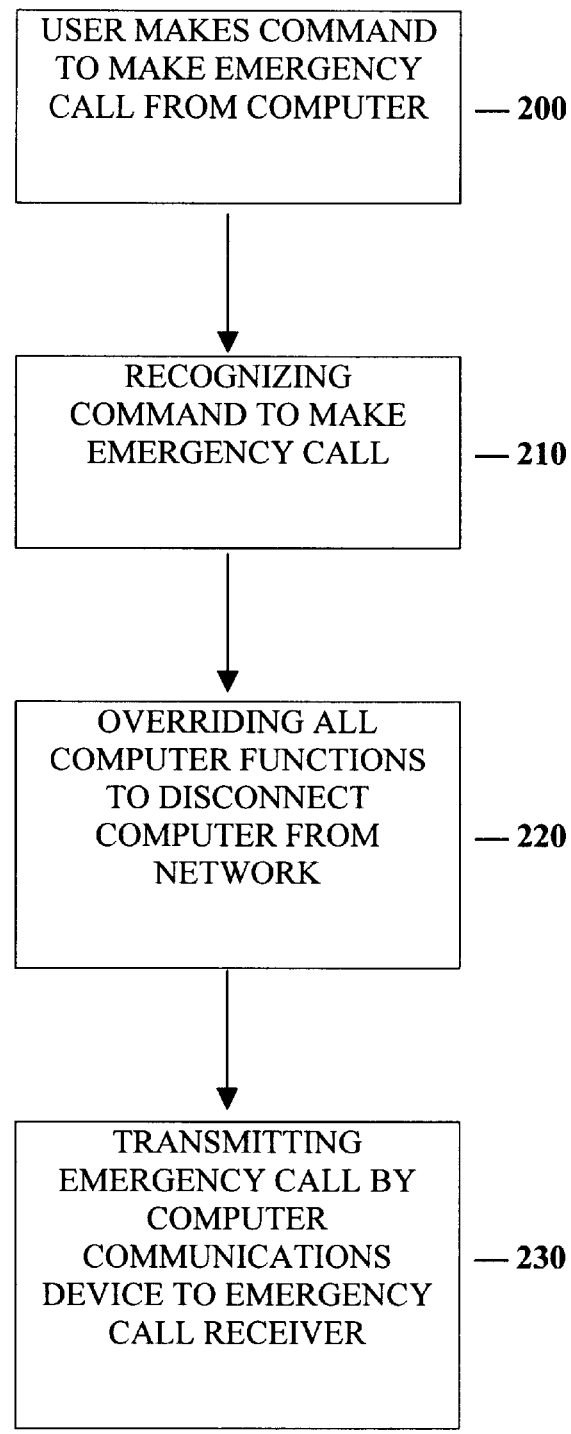
FIG. 2 is a flow chart diagram illustrating the process of making an emergency call while on-line on a computer in accordance with an embodiment of the present invention.

FIG. 2 illustrates a process of making an emergency call while on-line on a computer in accordance with an embodiment of the present invention. Steps 200 and 210 are similar to steps 100 and 110, respectively, described above. After the computer user issues a command to make an emergency call, and the software program executing on the computer recognizes the command to make the emergency call, step 220 differs from the steps in FIG. 1.

Instead of transmitting the emergency call over a network, the software program in step 220 overrides all computer functions and disconnects the computer from the network connection. Many local emergency services may not be adapted to receive emergency calls over a network or the Internet, and these emergency call receivers are only capable of receiving a traditional telephone call or facsimile transmission, which may be made once the computer is disconnected from the network.

The software program then transmits the emergency call by a computer communications device to an emergency call receiver in step 230. As described above, the computer communications device may be a computer modem adapted make a telecommunications transmission (over a traditional "landline" telephone line or a wireless cellular transmission) to the emergency call receiver. The computer communications device may also be adapted to transmit the emergency call using a computer generated signal (such as an alarm signal to the emergency call receiver), a computer generated voice, or in a facsimile format if the emergency call receiver is adapted to receive facsimile transmissions. Likewise, other data-pulse transmissions, multi-plexes, or related modes of transferring signal data both in real-time and otherwise, including memory-based transmissions, are contemplated.

Figure 3:
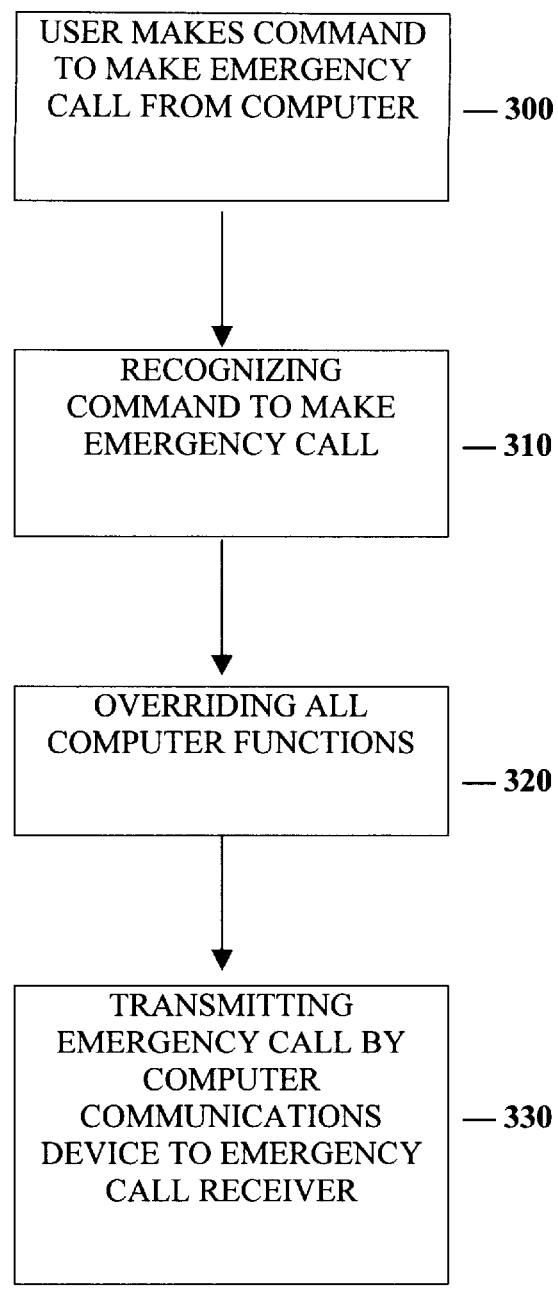
FIG. 3 is a flow chart diagram illustrating the process of making an emergency call from a computer in accordance with an embodiment of the present invention.

FIG. 3 illustrates a process of making an emergency call from a computer in accordance with an embodiment of the present invention. As mentioned above and illustrated in FIG. 3, the emergency call system may also be useful even if the computer is not on-line, but the computer user is nevertheless using the computer. Once the computer user issues the command to make an emergency call in step 300, the software program will recognize the command to make the emergency call in step 310. The software program will then override all computer functions in step 320; and the software program will transmit the emergency call by a computer communications device to an emergency call receiver in step 330.

Similar to the steps illustrated in FIG. 2, the embodiment of the present invention described in FIG. 3 transmits the emergency call without having to first disconnect from a network connection because the computer was not connected initially. This embodiment allows the computer user to make an emergency call while operating the computer and not being online. As described above, the computer communications device may also be adapted to transmit the emergency call using a computer generated signal (the alarm signal), a computer generated voice, or in a facsimile format if the emergency call receiver is adapted to receive facsimile transmissions.

While the description above refers to particular embodiments of the present invention, it will be understood that many modifications may be made without departing from the spirit thereof. The accompanying claims are intended to cover such modifications as would fall within the true scope and spirit of the present invention, and technical and legal equivalents.

The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. An emergency call system for making an emergency call while on-line on a computer, the system comprising:
    an input device attached to the computer for receiving a command to make the emergency call; and
    a software program executing on the computer capable of recognizing the command to make the emergency call and overriding all computer functions to transmit the emergency call over a network to an emergency call receiver.

2. The emergency call system according to claim 1, further comprising:
    an emergency button on the input device for receiving the command to make the emergency call.

3. The emergency call system according to claim 1, wherein the command is typed on the input device.

4. The emergency call system according to claim 1, wherein the input device is a voice recognition device adapted to recognize a voice command to make the emergency call.

5. The emergency call system according to claim 1, wherein the emergency call further contains address information, telephone information, e-mail information, and medical information.

6. The emergency call system according to claim 1, wherein the emergency call is transmitted as a facsimile to the emergency call receiver.

7. An emergency call system for making an emergency call while on-line on a computer, the system comprising:
    an input device attached to the computer for receiving a command to make the emergency call; and
    a software program executing on the computer capable of recognizing the command to make the emergency call and overriding all computer functions to disconnect the computer from a network, and transmitting the emergency call by a computer communications device to an emergency call receiver.

8. The emergency call system according to claim 7, further comprising:
    an emergency button on the input device for receiving the command to make the emergency call.

9. The emergency call system according to claim 7, wherein the command is typed on the input device of the computer.

10. The emergency call system according to claim 7, wherein the input device is a voice recognition device attached to the computer adapted to recognize a voice command to make the emergency call.

11. The emergency call system according to claim 7, wherein the emergency call further contains address information, telephone information, e-mail information, and medical information.

12. The emergency call system according to claim 7, wherein the emergency call is transmitted by the computer communications device using a computer generated voice to the emergency call receiver.

13. The emergency call system according to claim 7, wherein the emergency call is transmitted as a facsimile by the computer communications device to the emergency call receiver.

14. A method of making an emergency call from a computer, the method comprising the steps of:
    recognizing a command to make an emergency call;
    overriding all computer functions; and
    transmitting the emergency call by a computer communications device to an emergency call receiver, wherein the emergency call is transmitted by the computer communications device using a computer generated voice to the emergency call receiver.

15. An emergency call system for making an emergency call from a computer, the system comprising:
    an input device for receiving a command to make the emergency call;
    a software program executing on the computer capable of recognizing when the command to make the emergency call is made and overriding all computer functions, and transmitting the emergency call by a computer communications device to an emergency call receiver: and
    an emergency button on the input device for receiving the command to make the emergency call.

16. An emergency call system for making an emergency call from a computer, the system comprising:
    an input device for receiving a command to make the emergency call; and
    a software program executing on the computer capable of recognizing when the command to make the emergency call is made and overriding all computer functions, and transmitting the emergency call by a computer communications device to an emergency call receiver, wherein the command is typed on the input device of the computer.

17. An emergency call system for making an emergency call from a computer, the system comprising:
    an input device for receiving a command to make the emergency call; and
    a software program executing on the computer capable of recognizing when the command to make the emergency call is made and overriding all computer functions, and transmitting the emergency call by a computer communications device to an emergency call receiver, wherein the input device is a voice recognition device attached to the computer adapted to recognize a voice command to make the emergency call.

18. An emergency call system for making an emergency call from a computer, the system comprising:
    an input device for receiving a command to make the emergency call; and
    a software program executing on the computer capable of recognizing when the command to make the emergency call is made and overriding all computer functions, and transmitting the emergency call by a computer communications device to an emergency call receiver, wherein the emergency call further contains address information, telephone information, e-mail information, and medical information.

19. An emergency call system for making an emergency call from a computer, the system comprising:

an input device for receiving a command to make the emergency call; and a software program executing on the computer capable of recognizing when the command to make the emergency call is made and overriding all computer functions, and transmitting the emergency call by a computer communications device to an emergency call receiver, wherein the emergency call is transmitted by the computer communications device using a computer generated voice to the emergency call receiver.

20. An emergency call system for making an emergency call from a computer, the system comprising:

an input device for receiving a command to make the emergency call; and a software program executing on the computer capable of recognizing when the command to make the emergency call is made and overriding all computer functions, and transmitting the emergency call by a computer communications device to an emergency call receiver, wherein the emergency call is transmitted as a facsimile by the computer communications device to the emergency call receiver.

21. A method of making an emergency call while on-line on a computer, the method comprising the steps of:

recognizing a command to make an emergency call; and overriding all computer functions to transmit the emergency call over a network to an emergency call receiver.

22. The method for making an emergency call according to claim 21, wherein the command is from an emergency button on an input device of the computer.

23. The method for making an emergency call according to claim 21, wherein the command is typed on an input device of the computer.

24. The method for making an emergency call according to claim 21, wherein the command is a voice command recognized by a voice recognition device attached to the computer.

25. The method for making an emergency call according to claim 21, wherein the emergency call further contains address information, telephone information, e-mail information, and medical information.

26. The method for making an emergency call according to claim 21, wherein the emergency call is transmitted as a facsimile to the emergency call receiver.

27. A method of making an emergency call while on-line on a computer, the method comprising the steps of:

recognizing a command to make an emergency call;

overriding all computer functions to disconnect the computer from a network; and transmitting the emergency call by a computer communications device to an emergency call receiver.

28. The method for making an emergency call according to claim 27, wherein the command is from an emergency button on an input device of the computer.

29. The method for making an emergency call according to claim 27, wherein the command is typed on an input device of the computer.

30. The method for making an emergency call according to claim 27, wherein the command is a voice command recognized by a voice recognition device attached to the computer.

31. The method for making an emergency call according to claim 27, wherein the emergency call further contains address information, telephone information, e-mail information, and medical information.

32. The method for making an emergency call according to claim 27, wherein the emergency call is transmitted by the computer communications device using a computer generated voice to the emergency call receiver.

33. The method for making an emergency call according to claim 27, wherein the emergency call is transmitted as a facsimile by the computer communications device to the emergency call receiver.

34. A method of making an emergency call from a computer, the method comprising the steps of:

recognizing a command to make an emergency call;

overriding all computer functions; and transmitting the emergency call by a computer communications device to an emergency call receiver, wherein the emergency call is transmitted as a facsimile by the computer communications device to the emergency call receiver.

35. A method of making an emergency call from a computer, the method comprising the steps of:

recognizing a command to make an emergency call:

overriding all computer functions; and transmitting the emergency call by a computer communications device to an emergency call receiver, wherein the command is from an emergency button on an input device of the computer.

36. A method of making an emergency call from a computer, the method comprising the steps of:

recognizing a command to make an emergency call;

overriding all computer functions; and transmitting the emergency call by a computer communications device to an emergency call receiver, wherein the command is typed on an input device of the computer.

37. A method of making an emergency call from a computer, the method comprising the steps of:

recognizing a command to make an emergency call;

overriding all computer functions; and transmitting the emergency call by a computer communications device to an emergency call receiver, wherein the command is a voice command recognized by a voice recognition device attached to the computer.

38. A method of making an emergency call from a computer, the method comprising the steps of:

recognizing a command to make an emergency call;

overriding all computer functions; and transmitting the emergency call by a computer communications device to an emergency call receiver, wherein the emergency call further contains address information, telephone information, e-mail information, and medical information.

* * * * *